Figure 1:
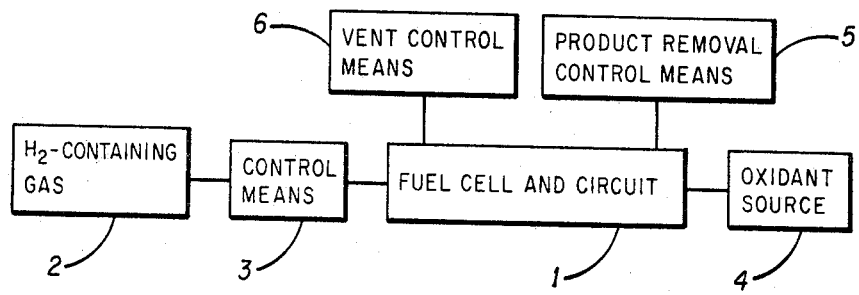

Oct. 22, 1968    W. JUDA ETAL    3,407,095
METHOD OF CONTROLLING UTILIZATION OF HYDROGEN IN
ELECTROLYTIC CELL
Filed Dec. 13, 1963

WALTER JUDA
MERRILL J. FOWLE
ALFRED F. D'ALESSANDRO
ROBERT L. NOVACK
  INVENTORS

BY Rines and Rines
ATTORNEYS

3,407,095
METHOD OF CONTROLLING UTILIZATION OF HYDROGEN IN ELECTROLYTIC CELL

Walter Juda, Lexington, and Robert L. Novack, Belmont, Mass., Merrill J. Fowle, Newtown Square, and Alfred F. D'Alessandro, Havertown, Pa.; said Fowle and said D'Alessandro assignors to Atlantic Refining Co., Philadelphia, Pa., a corporation of Pennsylvania; said Juda and said Novack assignors to Prototech Incorporated, Cambridge, Mass., a corporation of Massachusetts
Filed Dec. 13, 1963, Ser. No. 330,302
6 Claims. (Cl. 136—86)

The present invention relates to a method of controlling the utilization of hydrogen in electrochemical cells, and to novel hydrogen electrode means. The invention is more specifically, although not exclusively, directed to hydrogen electrode structures suited to fuel cell systems and the like and the effective use thereof.

In copending application, Ser. No. 260,457 of Walter Juda, entitled "Fuel Cell System and Method," filed on or about Feb. 25, 1963, and in numerous publications, there have been described fuel cell structures adapted for the utilization of gaseous hydrogen as a fuel that, when combined within an appropriate electrolytic medium with a suitable oxidant, will result in the generation of electric current between the electrodes which pass the hydrogen fuel and the oxidant into the electrolytic medium of the cell. In connection, more particularly, with the hydrogen anode, it has been proposed to employ therein a hydrogen-permeable palladium-containing layer which will permit diffusion therethrough of hydrogen but which is inherently impermeable to all other gases. Thus, if one employs an impure hydrogen fuel containing carbon dioxide and other impurities, such as hydrogen gas obtained by reforming methanol or hydrocarbons or other carbonaceous fuels, the entry of these impurities into the electrolytic medium of the cell is automatically prevented by the impermeable character of the palladium-containing layer.

The ability of a palladium membrane to act as a barrier to all gases but hydrogen, and the nature of hydrogen diffusion through palladium, have been well known for a long time. Similarly, the fact that certain alloys of palladium have at the same time superior diffusion and mechanical properties is also known. See, for example, U.S. Patent No. 2,773,561. In a fuel cell utilizing hydrogen as a fuel it is also known to utilize platinum or palladium dispersed on some porous support as the catalytic means of producing protons for the electrochemical reaction. Since a palladium or palladium-containing membrane is impervious to liquids, and therefore would act to separate a normally liquid electrolyte and the normally gaseous hydrogen fuel, such membrane acts simultaneously as a diffusion barrier to all gases but hydrogen, to separate the electrolyte from the fuel gas source, to catalyze the production of protons, and electronically to conduct electrons from the external circuit. A practical fuel cell, however, depends upon the full electrochemical utilization of hydrogen contained in an impure gas stream.

An object of this invention, therefore, is to provide a new and improved method of controlling the utilization of hydrogen in an electrochemical cell, including fuel cells and the like.

An additional object is to provide a new and improved fuel cell and the like.

Still another object is to provide a new and improved hydrogen electrode means that, while particularly well suited for purposes of utilization in fuel cells and the like, is of more general utility, as well, wherever the advantageous features of such electrode means are desired.

Other and further objects will be explained hereinafter and will be more particularly pointed out in connection with the appended claims.

In general, the instant invention relates to a method of, and apparatus for, controlling the utilization of hydrogen from a hydrogen-containing gaseous stream introduced into an electrochemical cell that comprises, interposing a hydrogen-permeable palladium-containing film or layer in the path of the hydrogen-containing gaseous stream and in contact with an electrolytic medium, venting hydrogen and inert gases from said path, adjusting the rate of flow of the vented gases so as to control the rate at which a minimum amount of hydrogen is removed with the vented gases, drawing current from the cell while maintaining a constant total pressure on the fuel side such that the hydrogen pressure is just sufficient to provide maximum desired current, and adjusting the pressure on the electrolyte side such that at open circuit substantially no diffusion of hydrogen occurs, whereby the loss of hydrogen is substantially eliminated at any current flow from zero to maximum. The operation is especially useful in fuel cells operating at reforming temperatures; e.g. cells operating above approximately 225° C.

In utilizing a palladium-containing membrane in accordance with our invention it is necessary to effect positive and absolute control of impurity or mixed gas concentration on the high hydrogen pressure side of the diffusion membrane. Thus it is essential to take a bleed or vent gas stream from the hydrogen-rich side of the membrane. At the same time it is also necessary to control the rate at which hydrogen flows out with the vented gases, as this represents a direct by-pass and therefore electrochemically unused hydrogen. In a diffusion device, the rate at which this vent gas stream is permitted to flow determines its composition, and the composition determines both the hydrogen loss and the available hydrogen partial pressure to establish diffusion. As an example, if it is desired to allow at least 90 percent of the incoming hydrogen to diffuse through the membrane, then the composition of the vent gas is related to the hydrogen content of the incoming gas as follows:

| Mol percent $H_2$ in incoming gas: | Mol percent $H_2$ in vent gas |
|---|---|
| 100 | 100 |
| 90 | 47.5 |
| 80 | 28.5 |
| 70 | 18.5 |
| 60 | 13.3 |
| 50 | 9.0 |

Figure 2:
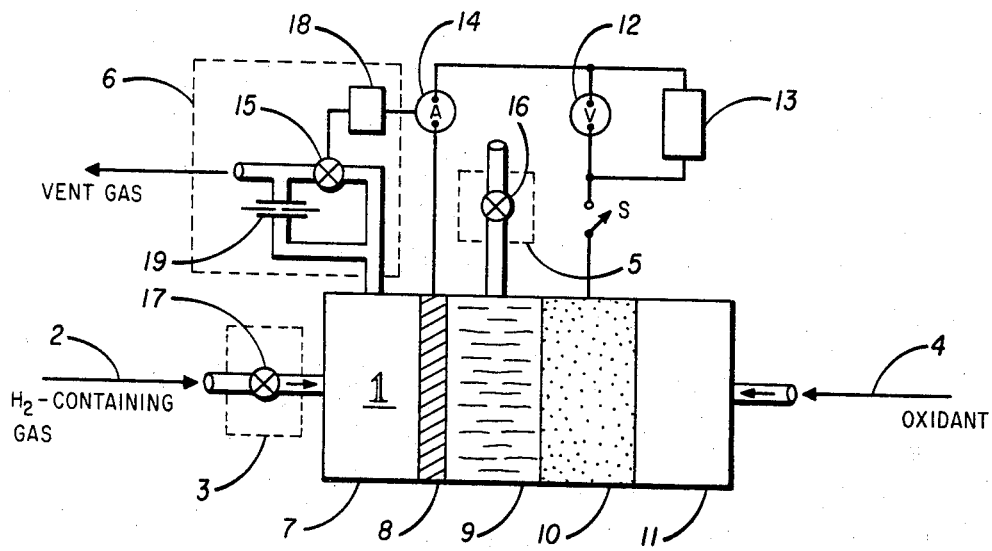
Figure 3:
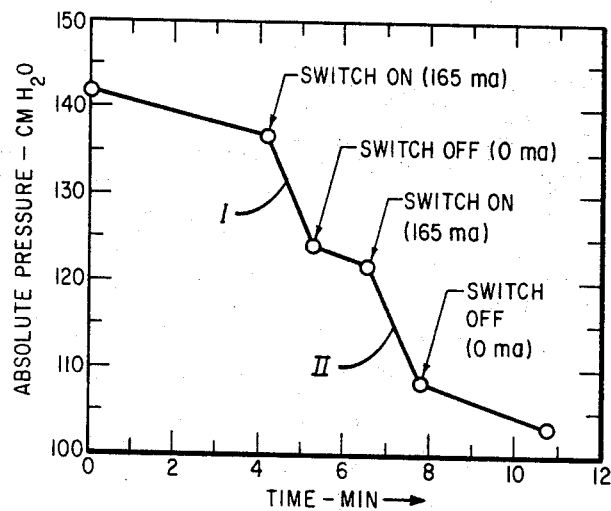

The invention will now be described in connection with the accompanying drawing, FIG. 1 of which is a block diagram of a preferred fuel cell system, illustrating cell construction and associated circuit controls for carrying out the method or process underlying the invention;

FIG. 2 is a schematic diagram of a fuel structure operating in accordance with the system of FIG. 1; and FIG. 3 is a graph of experimentally obtained results in a practical system operated in the manner illustrated in FIGS. 1 and 2.

Referring to FIG. 1, a fuel cell and associated electrical circuit are shown at 1, a hydrogen-containing gas source at 2, a control means 3 for controlling the rate of introduction of the hydrogen-containing gas, a source of oxidant 4, a control means 5 for controlling the rate of product removal, and a vent control means 6 for controlling the rate of removal of inert gases introduced by the hydrogen-containing gas. In the illustrative embodiment of the system of FIG. 1 contained in FIG. 2, hydrogen is converted to electricity by electrochemical oxidation utilizing air, oxygen or one or more of the halides, for example, as oxidant in a cell 1 operated at temperatures in excess of about 225 C. A hydrogen-containing gas is introduced into plenum chamber 7 at a rate to maintain constant pressure $P_1$ in the plenum chamber 7 by means of pressure control valve 17. The fuel gas is separated from the electrolyte 9 by a hereinafter described membrane 8 permeable to hydrogen only.

The membrane may be tubular, flat, circular, square or of other configuration to fit the design of the specific cell, so long as it is in contact with the fuel gas on one side (left-hand surface in FIG. 2) and the electrolyte on the opposite side (right-hand surface). It may be self-supporting or may be supported for mechanical strength and/or electronic conduction purposes. Palladium, or any of the suitable alloys of palladium that have substantial diffusion rates, such as palladium-silver, may be used as such a membrane. Because of its superior mechanical properties when used in a hydrogen atmosphere, and because of its superior permeation properties, it is preferable to use a palladium-silver membrane about 25 percent silver and 75 percent palladium.

Membrane 8, which also acts as the cell anode, is externally connected through ammeter 14, across one side of voltmeter 12 to a load 13, which is variable from open circuit to short circuit. An electrolyte 9 contacting the right-hand surface of the anode 8 may be a molten ion transport medium, such as potassium hydroxide or sodium hydroxide, in the case of oxygen or air as the oxidant; or, for example, an eutectic mixture of potassium chloride and lithium chloride, in the case of chlorine as the oxidant. In operations at temperatures above 225° C., the reaction products and inerts carried by the oxidant will be gaseous in nature and liberated from the cell 1 through a control valve 16 which maintains a constant pressure in the electrolyte chamber 9. The oxidant is fed at 4 into a further plenum chamber 11 under suitable flow control so as to maintain a proper electrolyte-oxidant interface at the cathode 10 which, in the case of halides, may be a suitable porous carbon, or in the case of oxygen, a porous nickel matrix, as an example. Either type of cathode may, if desired, be supported for mechanical or electronic conducting reasons. The cathode 10 is externally connected through the opposite side of voltmeter 12 to the load 13.

A vent gas system must be provided as an outlet for whatever inerts come into plenum chamber 7 with the fuel gas. In order that the loss of hydrogen through the vent gas line can be controlled, a valve 15 is inserted into the line between the plenum chamber 7 and the vent gas exhaust. To maintain a satisfactory hydrogen concentration for rapid acceptance of a substantial load from open circuit or no load conditions and to provide a protective hydrogen film for the anode at all times, especially at open circuit, a by-pass orifice 19 around the control valve 15 is provided, the orifice being sized to permit between 1 and 2 cc./hr./cm.$^2$ of anode area of gas to flow at all times. Ammeter 14 indicates continually the useful hydrogen flowing through anode membrane 8. If the total hydrogen flow is less than that required by the potential load, the ammeter indicates the hydrogen actually flowing; and if the total hydrogen is in excess of the load, the ammeter indicates the load demand, and the electrochemically consumed hydrogen, as before. Thus, control valve 15 must throttle the vent gas flow so that the flow of hydrogen through the anode membrane 8 will substantially equal the load requirements at the lowest possible rate of vent gas flow. This can be accomplished by any well-known means, as hereinafter explained, or, by hand, to cause control valve 15 continuously to hunt back and forth until no movement or change in the ammeter results. The vent gas system is then under control, and at all times the least possible loss of hydrogen through the vent system is maintained.

While there are many ways of achieving this control function, the following indicates one specific method:

Control valve 15 is of the type that continuously cycles or hunts to either side of the control point, for example, at a rate of a few seconds per cycle. Many types are available commercially, such as a null-balance control valve. The output of ammeter 14 goes to control means 18 which may be an analog controller comprising an electrical differentiation circuit and a binary comparator. The output signal of the differentiation circuit is determined by the rate of change of the position of the ammeter, and the signal goes to the binary comparator which recognizes either some change or no change. The output of the binary comparator is the output of analog controller 18. If the output represents no change in ammeter position, then the control point of valve 15 is moved to a more closed position. Alternately, when the signal represents a change in ammeter position, the control point of valve 15 is moved to a more open position. Other means of achieving this same control will be obvious to those skilled in the art, so long as these means are based on the fact that a change in rate of vent gas flow does not affect the position of the ammeter, then a potential over-supply of hydrogen exists in plenum chamber 7; and the quantity of hydrogen, and therefore the quantity of vent gas, may be decreased without affecting the electrical output of the cell. Conversely, if a change in vent gas flow causes a change in the ammeter reading, the electrical output of the cell is being controlled by the hydrogen pressure in plenum chamber 7, and an increase in vent gas flow will increase this hydrogen pressure and hence the electrical output of the cell.

In any operating fuel cell equipped with such a vent gas control system, the rate of vent gas flow will be at a maximum, and therefore the hydrogen content and hydrogen rate of flow highest at the maximum power output of the cell. Any partial use of the potential output will result in a further throttling of the vent gas flow and a consequent increase in utility of the hydrogen. At open circuit this would theoretically mean a zero hydrogen concentration in plenum chamber 7, and in any case a very low concentration. In order to have a supply of hydrogen in plenum chamber 7 at all times so that the cell is instantly responsive to load demands, a fixed small flow of vent gas is permitted through orifice 19. Thus even if this flow is only 1 or 2 cc. of gas per cm.$^2$ of electrodic area, the gas composition in plenum chamber 7 would rapidly change to equal that in the incoming fuel gas, if the diffusion rate at open circuit is negligibly small.

To achieve this, the total pressure is adjusted by the control point of valve 17 so that the desired maximum current will be obtained, with the vent gas control system functioning. At open circuit conditions, the pressure maintained in electrolyte chamber 9 is adjusted by the control point of product gas control valve 16 so that bubbles of hydrogen collect on the surface of membrane 8 in contact with the electrolyte but do not significantly disengage from the surface. Having set these two pressure levels, we have found that the flow of hydrogen through the membrane will at all times be proportional to the current generated, and essentially equal to the electrochemical requirements.

Thus, with the loss of hydrogen through the vent gas system minimized and the flow of non-electrochemically consumed hydrogen into the electrolyte through the membrane minimized, maximum use of the available hydrogen is achieved.

Within allowable limits, it is obvious that the size and thickness of the permeable film and the source of impure hydrogen will be selected so that at the expected maximum load an economic use of hydrogen will be achieved. The following illustrates the degree to which hydrogen can be electrochemically used, in accordance with the instant invention, and conversely the loss of hydrogen that can occur when these controls are not utilized:

A fuel cell of the above described type using a 1/16 inch O.D. 25 percent silver, 75 percent palladium tube, with 5 sq. cm. of its external surface immersed in a molten salt electrolyte, such as KOH, at 400° C., and attached at one end to a source of fuel gas containing hydrogen, carbon dioxide, carbon monoxide and water vapor, and at the other end to an adjustable vent valve with an enclosed volume of 500 ml. for the whole anode assembly, and a cathode immersed in the same electrolyte made of sintered nickel with an exposed area of 5 sq. cm. connected to a supply of air, the whole being enclosed with an adjustable product gas valve, is connected to an external load variable from an infinite resistance at open circuit and a resistance of less than one ohm at short circuit with a milliammeter to measure cell performance, and flow meters to measure fuel gas consumed and vent gas produced.

With the fuel gas side of the anode assembly and the electrolyte chamber maintained at 1 atmosphere absolute, and with the anode assembly supplied with a fuel gas containing 50 mol percent hydrogen, with the vent valve open and the system allowed to come to a steady state, if a short circuit load and a completely closed vent valve are simultaneously established, an output of 2500 ma. will be attained for 6 minutes, and by the end of 21 minutes the output will drop to 1500 ma., and in one hour to 160 ma. By the time the output reaches zero the total flow of fuel gas is 192 ml., and at this point neither open circuit nor short circuit will produce any further change.

With the same 50 percent hydrogen supply and both sides of the anode at 1 atmosphere absolute pressure as before, the system may be brought to equilibrium at short circuit with the vent valve open. The vent valve is adjusted until the observed 2500 ma. is just maintained, and a vent gas rate of 5,025 ml./hr. observed. Maintaining this rate constant will result in the following:

| Current Density, ma./cm.$^2$ | Vent Gas, ml./hr. | Fuel Gas, ml./hr. | Hydrogen Efficiency, Percent |
| --- | --- | --- | --- |
| 500 | 5,025 | 6,190 | 34 |
| 400 | 5,025 | 5,960 | 28 |
| 300 | 5,025 | 5,700 | 22 |
| 200 | 5,025 | 5,490 | 15 |
| 100 | 5,125 | 5,260 | 8 |
| 0 | 5,025 | 5,025 | ------ |

The flow of vent gas and fuel gas are equal at open circuit indicating no diffusion of hydrogen through the Ag-Pd tube. A current of 5400 ma. would result from total conversion of this hydrogen to electricity.

Bringing the cell, as above, to equilibrium at short circuit with the vent gas rate adjusted so as to just maintain a current flow of 2500 ma. and a vent gas rate of 5025 ml./hr., and adjusting the vent gas rate at each subsequent load setting, will result in the following:

| Current Density, ma./cm.$^2$ | Vent Gas, ml./hr. | Fuel Gas, ml./hr. | Hydrogen Efficiency, Percent |
| --- | --- | --- | --- |
| 500 | 5,025 | 6,190 | 34 |
| 400 | 2,150 | 3,080 | 54 |
| 300 | 1,075 | 1,740 | 72 |
| 200 | 630 | 1,094 | 77 |
| 100 | 273 | 508 | 82 |
| O.C. | 10 | 10 | ------ |

Taking an arbitrary small vent gas rate of 10 ml. per hour as minimum, makes the fuel gas and vent gas flows equal.

With the same 50 percent hydrogen fuel gas source, the anode gas chamber being maintained at 2 atmosphere absolute pressure and the electrolyte chamber at 1 atmosphere absolute pressure, the following will result at a vent gas rate determined for 2500 ma. at short circuit:

| Current Density, ma./cm.$^2$ | Vent Gas, ml./hr. | Fuel Gas, ml./hr. | Hydrogen Efficiency, Percent |
| --- | --- | --- | --- |
| 500 | 1,900 | 3,060 | 69 |
| 400 | 1,900 | 2,820 | 59 |
| 300 | 1,900 | 2,600 | 48 |
| 200 | 1,900 | 2,360 | 36 |
| 100 | 1,900 | 2,130 | 20 |
| 0 | 1,900 | 1,900 | ------ |

As above, the fuel gas and vent gas flows are the same at open circuit. A current of 950 ma. would result from total conversion of this hydrogen to electricity.

With the vent gas rate readjusted at each discharge level, the following will result:

| Current Density, ma./cm.$^2$ | Vent Gas, ml./hr. | Fuel Gas, ml./hr. | Hydrogen Efficiency, Percent |
| --- | --- | --- | --- |
| 500 | 1,900 | 3,060 | 69 |
| 400 | 1,300 | 2,230 | 76 |
| 300 | 875 | 1,570 | 80 |
| 200 | 535 | 1,000 | 82 |
| 100 | 255 | 490 | 86 |
| 0 | 10 | 10 | ------ |

At open circuit, the fuel gas rate is the same as the vent gas, and small bubbles of hydrogen will appear on the electrolyte face of the silver-palladium tubing.

However, maintaining the pressure of the same 50 percent hydrogen fuel gas at 3 atmosphere absolute pressure and venting the products at 1 atmosphere absolute pressure, will result in the following at a constant vent rate determined at short circuit:

| Current Density, ma./cm.$^2$ | Vent Gas, ml./hr. | Fuel Gas, ml./hr. | Hydrogen Efficiency, Percent |
| --- | --- | --- | --- |
| 500 | 1,560 | 2,730 | 77 |
| 400 | 1,560 | 2,500 | 67 |
| 300 | 1,560 | 2,270 | 56 |
| 200 | 1,560 | 2,050 | 40 |
| 100 | 1,560 | 1,960 | 21 |
| 0 | 1,560 | 1,870 | ------ |

Thus, at open circuit, the fuel gas rate will be higher than the vent gas rate, and the product gas valve will have to be throttled to establish a pressure of 1.50 atmosphere absolute pressure over the electrolyte to make the flows equal. At this pressure the above values will be the same except that at 100 ma./cm.$^2$, a fuel gas rate of 1800 ml./hr. and a hydrogen efficient of 23 percent will result.

Under the same conditions as the foregoing, adjusting the vent gas rate for each discharge level will result in the following:

| Current Density, ma./cm.$^2$ | Vent Gas, ml./hr. | Fuel Gas, ml./hr. | Hydrogen Efficiency, Percent |
| --- | --- | --- | --- |
| 500 | 1,560 | 2,730 | 77 |
| 400 | 1,150 | 2,080 | 81 |
| 300 | 870 | 1,570 | 83 |
| 200 | 510 | 980 | 86 |
| 100 | 250 | 480 | 88 |
| 0 | 10 | 13 | ------ |

Increasing the electrolyte chamber pressure to 1.5 atmosphere absolute pressure, will result in a fuel gas rate of 10 ml./hr., while all other values remain the same.

Substituting a 75 percent hydrogen concentration gas for the above 50 percent fuel gas, then at open circuit the electrolyte pressure would require an increase to 2.25 atmosphere absolute pressure to make the gas flows equal, and at these pressures the following will result:

Current density, ma./cm.$^2$ _____ 300
Vent gas, ml./hr. _____ 52
Fuel gas, ml./hr. _____ 960
Hydrogen efficiency, percent _____ 88

Under these same conditions, substituting a commercially pure hydrogen of 98 percent hydrogen concentration as the fuel gas source, and with a 10 ml. minimum vent gas flow, will result in the following:

Current density, ma./cm.$^2$ _____ 300
Vent gas, ml./hr. _____ 10
Fuel gas, ml./hr. _____ 750
Hydrogen efficiency, percent _____ 83

At open circuit, the electrolyte pressure would require an increase to 2.94 atmosphere absolute pressure to produce equal gas flows and no diffusion.

Other thicknesses of membrane and other fuel gas compositions will produce corresponding results showing in all cases that a vent gas stream must be taken, that a continuously adjusted vent gas stream produces the lowest hydrogen loss at any cell performance, that a small minimum vent gas flow keeps the cell ready for any sudden power demand, and that proper adjustment of the electrolyte chamber pressure will prevent diffusion at open circuit conditions.

Referring to FIG. 3, there is shown a graph of results obtained with a system of the character shown in FIG. 2, involving a Ag-Pd anode 8 in the form of a 1/16 inch outer-diameter tube, 3 mils wall thickness, and 4.5 cm. long, a dense welding-rod carbon thimble provided with 1/16 inch holes drilled in the end thereof and about 1/2 inch diameter serving as cathode 10, and an electrolytic medium 9 of molten NaOH maintained at about 425° C., with anode 8 and cathode 10 spaced about 3 cm. apart in the melt, and with oxygen introduced at 11 with about 12 cm. of Hg pressure. It was found that reduction of the pressure of the hydrogen introduced at 7 below the pressure of the electrolytic medium 9, which was substantially atmospheric inside the cell, enabled substantially no diffusion of hydrogen through anode 8 into the cell 9 when the load circuit 13 was opened, but substantial passage of hydrogen therethrough substantially instantaneously upon closing the circuit through load 13. When the cell was adjusted to draw substantially maximum current of the order of 165 ma., moreover, it was found that the ratio of the hydrogen-transfer rate through the anode 8 when load circuit 13 was opened to the hydrogen movement rate under such maximum current drain when load circuit 13 is closed, was of the order of 1 to 13. A typical ratio (at, for example, 2.5 cm. of mercury below atmospheric pressure) of the substantially negligible or unsubstantial hydrogen diffusion rate in the absence of drawing current to that under conditions of maximum current drain, was found to be 0.843 cm. of $H_2O$ pressure per minute to 10.97 cm. of $H_2O$ pressure per minute.

Referring to the graph of FIG. 3, in other tests with this apparatus, the instantaneous valving between substantially negligible hydrogen diffusion and sufficient hydrogen diffusion to approach maximum utilization in the cell is illustrated by the rapidly falling curve portions I and II, following instants labeled "switch-on," representing the closing of the load circuit 13 in FIG. 2. These rapidly falling regions I and II indicate substantial hydrogen movement by the rapid drop in pressure, as measured along the ordinate, time being measured from left to right along the abscissa.

As a second example, in a system such as in FIG. 2, a Ag-Pd tube, 1/16 inch outer diameter, .003 inch thick and 10 cm. long, a porous carbon disc made of NC-60 electrode carbon, 20 mm. in diameter and 6.4 mm. thick (utilizing chlorine as the oxidant), spaced about 3 cm. apart in an electrolyte of 0.4 KCl, 0.6 LiCl at substantially atmospheric pressure and 400° C., where the hydrogen pressure in the tubular anode was maintained at 28 mm. Hg above atmospheric, the ratio of hydrogen flow at the maximum power production was approximately 41 times (current=425 ma.) the flow of hydrogen when the load circuit 13 was open. Thus with the load circuit open (switch S open), a negligible flow of less than 1/40 that instantaneously observed upon closing the load circuit was noted.

In a similar Ag-Pd anode and NC-60 cathode, the hydrogen pressure in the tube was varied from 200 mm. of Hg, the pressure required to provide enough hydrogen by normal gaseous diffusion at atmospheric pressure and 400° C. for the electrolytic reaction involved, to 3 mm. of Hg without any variation in cell performance. Without the valve action the flow of $H_2$ at 3 mm. would only be 1.3 percent of that required for the 475 ma. current observed, or a predicted current of 6.2 ma.

As another example, a LiCl-KCl eutectic medium 9, as in FIG. 2, was operated at a temperature of about 420° C. with a Ag-Pd anode 8, 1/16 inch in diameter provided with a small end aperture and about 7 cm. long with 4.5 cm. Hg pressure of hydrogen and PC-57H carbon cathode 10 about 1/4 inch long and 5 mm. in diameter. Chlorine oxidant was introduced at 11 at about 32 cm. of Hg pressure. With the load circuit 13 open, so that no current was withdrawn in the output circuit, bubbles of hydrogen collected on the surface of the Ag-Pd tube but no bubbling of hydrogen in the vicinity of the tube-electrolyte interface was observed; but when current was drawn, large and rapid bubbling action of hydrochloric acid gas, escaping upward as at 16 in FIG. 2, was observed with a maximum current drain of 330 ma., again proving the substantially instantaneous and effective valving action.

Once the valving action is commenced by the closing of the switch S and the withdrawing of current, it has been found that a smaller degree of control within a limited range may be effected through variation of a potentiometer, not shown, in circuit with the load, which enables variation of the current that is withdrawn and simultaneously a corresponding slight change in the hydrogen transfer rate.

In another example, a Ag-Pd anode, 1/16 inch in diameter with a 3 mil wall, was connected with a supply of hydrogen at 5.0 cm. Hg pressure at one end and a bleed at the other end and arranged so that its immersion into an eutectic mixture of KCl-LiCl at about 400° C. could be varied. A carbon cathode (NC-60), 20 mm. in diameter by 6.4 mm. long, was connected to a supply of chlorine at a pressure of about 3.0 cm. of Hg. At a constant cell voltage of 0.5 volt, the following cell performance was determined at the indicated anode immersions:

| Anode area (cm.$^2$): | Cell output (ma.) |
| --- | --- |
| 5.08 | 590 |
| 3.80 | 582 |
| 2.53 | 557 |
| 1.90 | 512 |
| 1.27 | 440 |
| 0.63 | 362 |

These data points are symptotic to and indicate a maximum current density of about 1200 ma./cm.$^2$, and indicate the limit of hydrogen availability by diffusion during cell operations.

As before intimated, moreover, operation of the source of hydrogen gas at such reduced pressure eliminates not only the loss problems at the anode 8 at open-circuit (switch S open), but permits substantially complete electrochemical hydrogen utilization at maximum current drain (with switch S closed) and thus results in excellent hydrogen utilization. In accordance with a discovery underlying the invention, this enables the instantaneous substantial utilization of hydrogen when current is to be drawn from the cell and the substantially negligible diffusion when the cell is in stand-by condition.

In instances where corrosive attack of the palladium-containing layer 8 is to be avoided by a hydrogen protective layer, the pressure may be reduced at 7 to permit only a slight passage of hydrogen in the absence of output-current drain.

As an example illustrative of such corrosion-protecting action of a controlled small diffusion rate under open-circuit conditions, a LiCl-KCl eutectic electrolyte was maintained molten at about 420° C. Into the electrolyte were inserted a 12 mm. diameter PC-57H porous carbon cathode 10, about 1/4 inch thick and 9.15 cm. long, and a semi-circular Ag-Pd tubular anode 8, about 9.15 cm. lond and 1/16 inch in diameter. With chlorine used as the oxidant and introduced at about 30 cm. of Hg pressure and with hydrogen pressure of the order of 15 cm. of Hg, the sharp and substantially instantaneous valving action was again observed, but with few large protective bubbles fixed to the Ag-Pd surface in the absence of output current and a sizable small-bubble flow observable when current of 240 ma. was drawn upon the closing of the load circuit.

Further modifications will suggest themselves to those skilled in the art and all such are considered to fall within the spirit and scope of the invention as defined in the appended claims.

What is claimed is:

1. A method of controlling utilization of hydrogen in an electrolytic cell, which comprises feeding an impure hydrogen-containing gaseous stream from a source at a predetermined pressure, interposing a layer selectively permeable to hydrogen but impermeable to other gases directly in the path of the hydrogen-containing gaseous stream and with one side of the layer in contact with the electrolytic medium of the cell and with said stream applied to the other side, contacting an oxidant electrode with said medium, drawing current in a circuit including the said layer and said electrode, venting gas from said stream at said other side of said layer, controlling the flow of vented gas in accordance with the current drawn so that the vented gas flow is substantially just sufficient to provide the current requirements of the cell, terminating the drawing of current, and providing a minimal flow of vented gas from said stream at said other side of said layer while no current is drawn and while continuing the feeding of said stream to said other side at said predetermined pressure, the minimal flow of vented gas being substantially just sufficient to provide substantially instantaneous flow of hydrogen through said layer and substantially instantaneoous response to the current requirements of said cell when said current is again drawn.

2. A method in accordance with claim 1, wherein said minimal flow of vented gas is sufficient to provide a corrosion-protection film upon said layer but insufficient to permit appreciable loss of hydrogen through said layer when no current is drawn.

3. A method in accordance with claim 1, wherein the electrolytic medium comprises a halogen.

4. A method in accordance with claim 1, wherein said electrolytic medium comprises an hydroxide.

5. A method in accordance with claim 1, wherein said electrolytic medium is in molten state.

6. A method in accordance with claim 1, wherein said layer is a palladium-containing layer.

References Cited

UNITED STATES PATENTS

| | | | |
|---|---|---|---|
| 3,291,643 | 12/1966 | Oswin et al. | 136—86 |
| 2,901,525 | 8/1959 | Gorin et al. | 136—86 |
| 3,002,039 | 9/1961 | Bacon | 136—86 |
| 3,132,972 | 5/1964 | Ludwig | 136—86 |
| 3,148,089 | 9/1964 | Oswin | 136—86 |
| 3,180,762 | 4/1965 | Oswin | 136—86 |
| 3,202,546 | 8/1965 | Rightmire et el. | 136—86 |
| 3,259,524 | 7/1966 | Fay et al. | 136—86 |

FOREIGN PATENTS

| | | |
|---|---|---|
| 8,080 | 1896 | Great Britain. |

OTHER REFERENCES

Continuous Feed Fuel Cell Systems Technical Report No. WADC TR–57–605, February 1962, Leesona Corp., Patterson Moos Research Division, only pp. 22, 23 and 37 relied upon.

ALLEN B. CURTIS, *Primary Examiner.*